Figure 1:
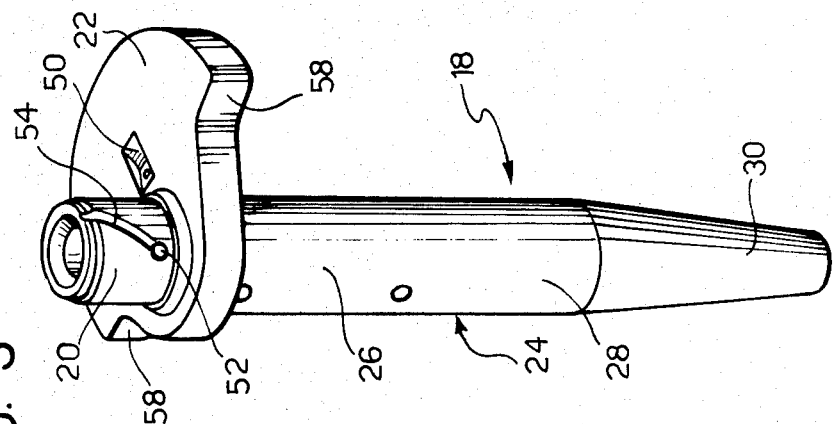

United States Patent [19]

Andrione et al.

[11] Patent Number: 4,493,226
[45] Date of Patent: Jan. 15, 1985

[54] CRANKSHAFT FOR SMALL RECIPROCATING MACHINES

[75] Inventors: Norbert Andrione; Federigo Peruzzi, both of Turin; Giancarlo Scandurra, Cuorgnè, all of Italy

[73] Assignee: Aspera S.p.A., Castelnuovo Don Bosco, Italy

[21] Appl. No.: 398,146

[22] Filed: Jul. 14, 1982

[30] Foreign Application Priority Data

Aug. 3, 1981 [IT] Italy ................ 68090 A/81

[51] Int. Cl.$^3$ ............................................. F16C 3/04
[52] U.S. Cl. ............................................. 74/598; 74/605; 29/6
[58] Field of Search ................ 74/605, 598, 603; 29/6

[56] References Cited

U.S. PATENT DOCUMENTS 3,491,939  1/1970  Larsen et al. ................ 74/605
4,015,908  4/1977  Ashley ................ 29/6

FOREIGN PATENT DOCUMENTS 654121  6/1951  United Kingdom ................ 29/6
678996  9/1952  United Kingdom ................ 74/603

Primary Examiner—Kenneth J. Dorner
Attorney, Agent, or Firm—Sughrue, Mion, Zinn, Macpeak, and Seas

[57] ABSTRACT

The crankshaft is of the type comprising, in succession in its longitudinal direction, a crank pin intended to receive a connecting rod big end, an eccentric of flattened sector shape, and an elongate tubular part, non-coaxial with respect to the crank pin and acting partly as a journal and partly as a support for a rotary member, such as a rotor of an electric motor. The crank pin and the eccentric are made in a single metal piece and the elongate tubular part is constituted by a separate tubular metal piece. The face of the eccentric which is turned towards the tubular piece and the corresponding end of this piece have respective annular formations engaged and retained one in the other by means of welding or glueing.

2 Claims, 6 Drawing Figures

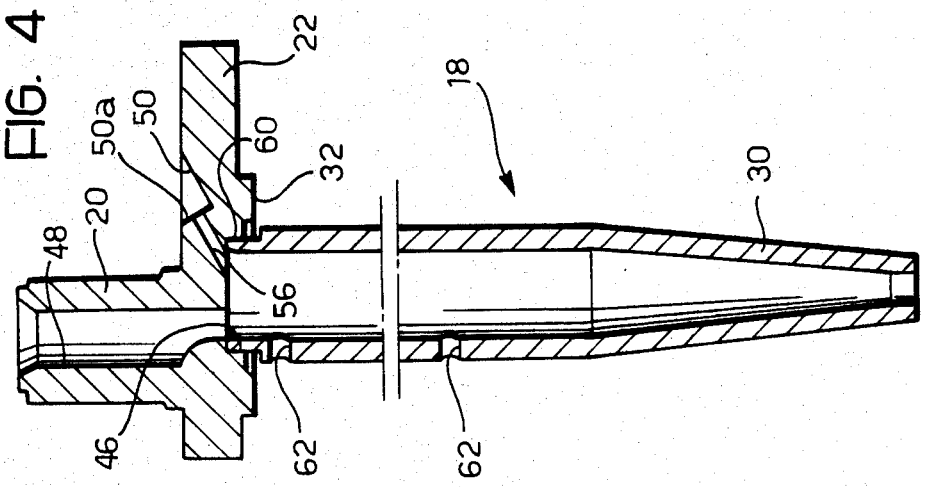
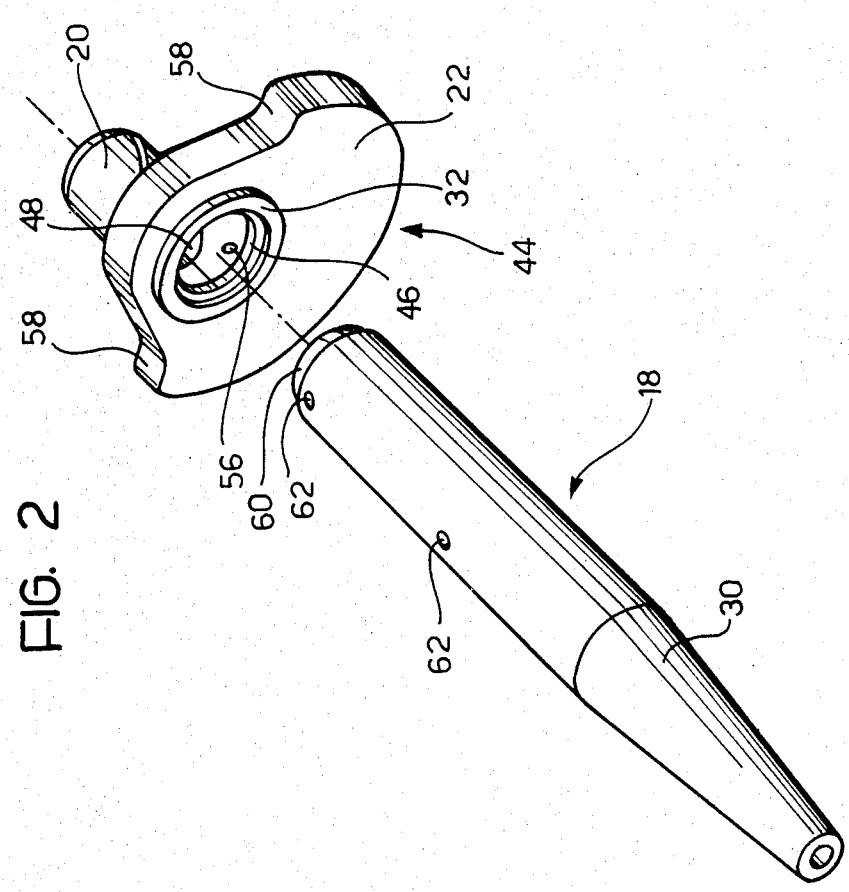

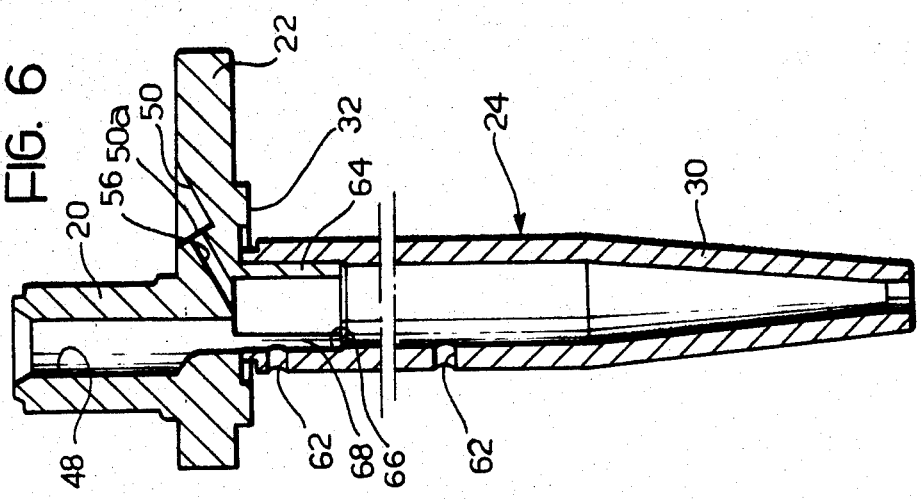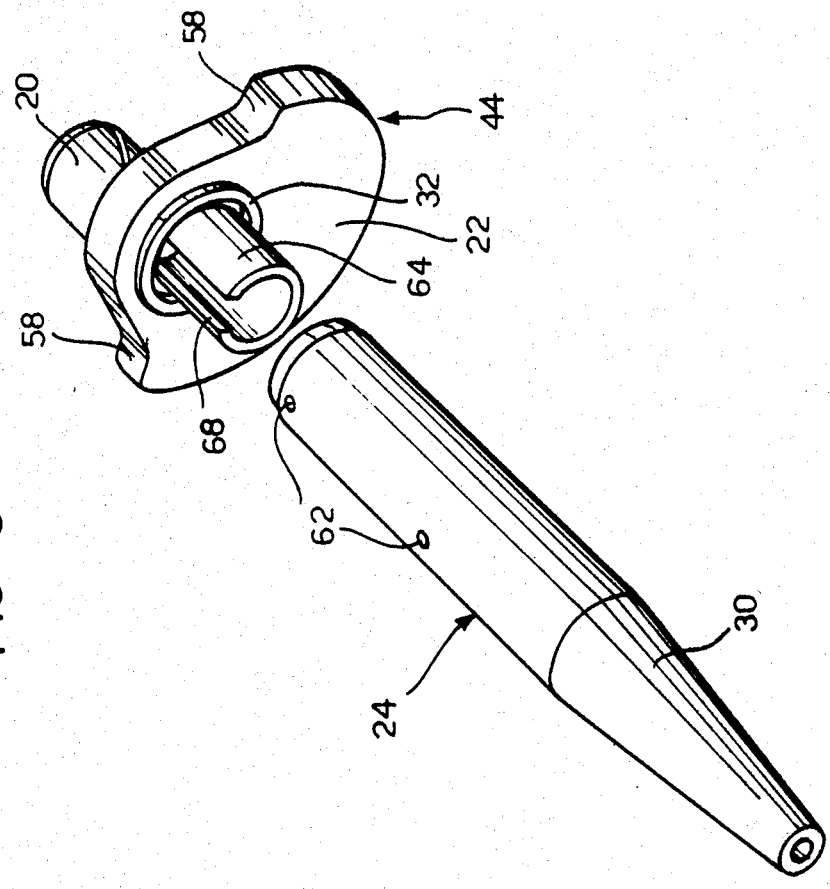

CRANKSHAFT FOR SMALL RECIPROCATING MACHINES

The present invention relates to a crankshaft for small reciprocating machines, particularly hermetic compressors for refrigerators, of the type including, in succession in its longitudinal direction, a crank pin intended to receive a connecting rod big end, an eccentric in the form of a flattened sector and an elongate tubular part, non-coaxial with respect to the crank pin, and acting partly as a journal and partly as a support for a rotary member, such as a rotor of an electric motor.

Crankshafts of the aforesaid type have conventionally always been formed in a single piece, for example, from forged steel or spheroidal cast iron. The fabrication of crankshafts by these methods is rather costly, so that any reductions in the manufacturing costs are well received.

A reduction in manufacturing costs could be achieved, at least in theory, by forming the crankshafts by the method of sintering metal powders, but set against this solution in practice is the actual impossibility of forming very long tubular parts by sintering.

The problem which is at the root of the present invention is that of providing a crankshaft of the type previously mentioned which lends itself to extremely economical manufacture.

According to the present invention this problem is solved by means of a crankshaft of the aforesaid type, characterised in that the crank pin and the eccentric are formed in a single metal piece, the elongate tubular part is constituted by a separate tubular metal piece and the face of the eccentric turned towards the said tubular piece and the corresponding end of this piece have respective annular formations engaged and retained one in the other.

The retention of the annular formations in the engaged position may be achieved by means of welding, preferably of the projection type, or by means of a structural or anaerobic adhesive for metals.

The formation of the crankshaft in the said manner is extremely simple and economical.

The only complex piece which is to be formed is that comprising the crankpin and the eccentric. This piece may advantageously and economically be formed in sintered metal, a technique which affords, in a single sintering operation, a semi-finished piece which requires few and simple, further working operations.

A simple soft steel tube, even of relatively mediocre quality and hence relatively cheap, may be used to form the elongate tubular part.

Figure 3:
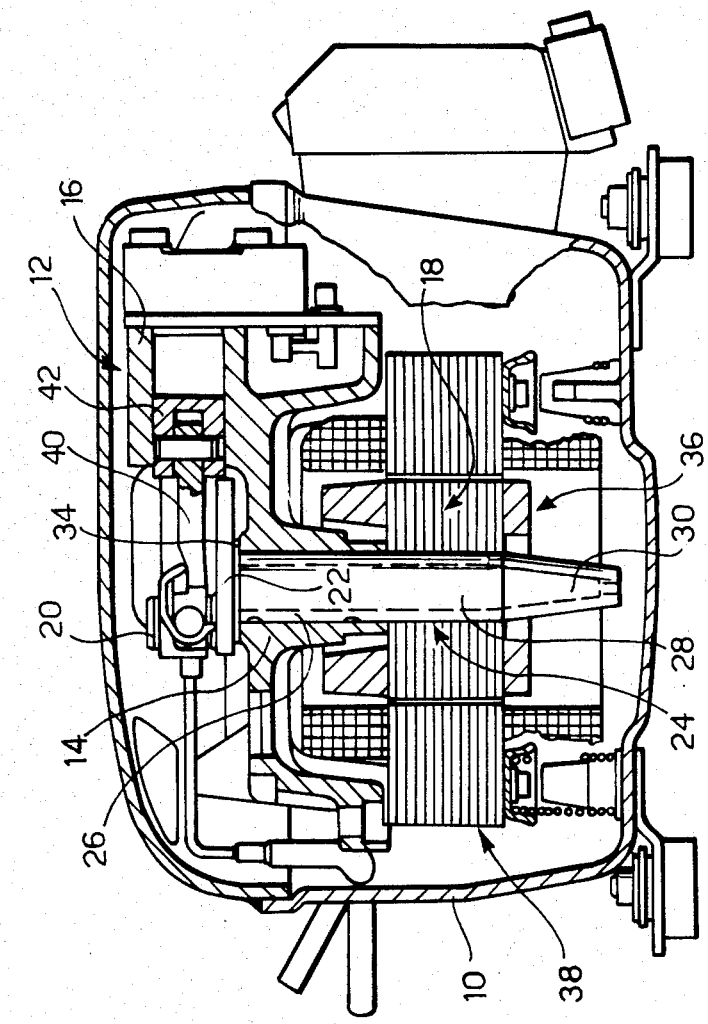

Other advantageous characteristics of the invention will become apparent from a reading of the detailed description which follows with reference to the appended drawings, given by way of non-limiting example, in which:

FIG. 1 is a vertical section of a hermetic compressor for refrigerators incorporating a crankshaft according to the invention, FIG. 2 is a perspective view of two components of the crankshaft according to a first embodiment, before their union, FIGS. 3 and 4 are respectively a perspective view and a shortened longitudinal sectional view of the crankshaft of FIG. 2 with its two components joined, and FIGS. 5 and 6 are drawings similar to FIGS. 3 and 4 illustrating a second embodiment of the crankshaft.

Referring to FIG. 1, a small hermetic compressor for refrigerant fluids, of the type used at present, for example in domestic refrigerators, includes a sealed sheet steel casing 10.

A compressor frame 12 is resiliently suspended in the casing 10. The frame 12 preferably consists of an iron casting and comprises among other things a central journal 14, arranged with its axis vertical, and an upper cylinder 16 with its axis horizontal. A vertical crankshaft, generally indicated 18, the details of which are better seen in FIGS. 2 to 4, is associated with the frame 12.

The main parts of the crankshaft 18 comprise, in succession from the upper end to the lower end, a crank pin 20, an eccentric 22 in the form of a flattened sector and an elongate tubular part 24.

The tubular part 24 may be considered as subdivided into two cylindrical sections, an upper section 26 and an intermediate section 28 without discontinuity between them, and a lower section 30 of frusto-conical form.

The upper cylindrical section 26 is rotatably mounted in the journal bearing 14. Moreover, the lower face of the eccentric 22 has an annular projection 32 which cooperates in the manner of a thrust bearing with an upper annular raised surface 34 of the journal bearing 14.

The squirrel cage rotor 36 of an electric motor, the stator 38 of which is fixed at its lower end to the frame 12, is keyed to the intermediate cylindrical section 28, by means not shown.

The big end 40 of a connecting rod is coupled to the crank pin 20, the other end of the rod being connected to a piston 42 slidable in the cylinder 16 of the compressor.

The lower, frusto-conical section 30 of the tubular part 24 dips into the oil which is located in the lower part of the casing 10 and, during rotation of the shaft, acts, in known manner as an axial-centrifugal pump for the purposes of lubrication, as will be further clarified below.

Referring now to FIG. 2, the crank pin 20 and the eccentric 22 are formed in a single piece, indicated in its entirety by 44. Advantageously these parts comprise a piece formed from sintered metal.

The piece 44 is separate from the tubular part 24 which constitutes a piece in its own right, of which more will be said below.

In the formation of the piece 44, the face of the eccentric 22 opposite the pin 20, is formed as an annular engagement formation constituted by a circular seat of shallow depth, and flared mouth. In addition, during formation of the piece 44, the crank pin 20 is formed with a tubular configuration, that is, with an internal axial duct 48. This duct opens at the upper or free end of the pin 20 and also opens into the seat 46 at its opposite or lower end (best seen in FIG. 4).

During sintering, an indent 50 is formed in the upper face of the eccentric 22 (also see FIG. 3).

The piece 44, before its union with the piece 18 which will be described below, is subjected to a few, simple, mechanical working operations. One of these working operations is the formation of a transverse lubrication hole 52 in the crank pin 20 (FIG. 3). This hole 52 opens to the exterior of the pin 20 at one end of a lubricating groove 54 of the rotary coupling with the big end 16. Another hole 56 (FIGS. 2 and 4) is formed starting from one oblique face 50a of the indent 50, perpendicular to this face. The hole 56 allows the de-gassing of the oil, in that its lower opening is in a zone outside the film of ascending oil. Thus also, the oil overflows from the upper end of the duct 48 in operation of the compressor and is thrown by centrifugal force against the internal surface of the upper part of the casing 10 in order to cool it and against the piston 42 to lubricate the latter and the rotary coupling between its gudgeon pin and the small end 40.

The outer surface of the crank pin 20 and the surface of the annular projection 32 may also be pre-ground before the coupling of the piece 44 with the piece 24.

As will be understood, all the said mechanical operations, being carried on a piece (44) which is small and manageable, are more economical, than is the case if these same operations are carried out on a one-piece crankshaft. In these operations, in order to position the piece 44, reference is made to a pair of diametrally opposed surfaces 58 of the eccentric 22.

Coming now to the other piece 24, this consists of a piece of tube which may be obtained from a continuous calibrated tube of soft steel of relatively mediocre quality such as for example "Fe 35".

The use of this low cost material allows a considerable saving in itself. On the other hand the use of this material is wholly justified by the fact that the section 26 in the tubular part 28 is coupled to a cast iron bearing 14 and rotary couplings between cast iron and soft steel, with suitable lubrication, are entirely acceptable in low power machines.

The piece of tube 18 is obtained from the continuous tube with a few simple operations which may be effected "in line" and which consist in the cutting off of the pieces, the turning of one end, so as to form an annular end portion 60 of smaller section, which constitutes an annular formation intended to engage the seat or corresponding annular formation 46 of the piece 44, in pre-grinding and in shaping the section 30 to the substantially frusto-conical form. The exact profile of the end portion 60 has not been shown since it depends on the method adopted for its fixing into the seat 46.

Transverse lubricating holes 62 for the journal bearing are also formed in the piece 18.

With regard to the formation of the frusto-conical part 30, this may be achieved by rotary hammering with a tapered pin within the piece 18.

The two pieces 18 and 44 formed in the manner described and illustrated are finally fixed together, to form the crankshaft, by means of engagement of the annular end portion 60 in the circular seat 46. Once this engagement has been effected, the preferred method for obtaining the final union is projection welding.

Another method of joining is glueing with a structural adhesive for metals.

If the coupling between the annular end portion 60 and the circular seat 46 have been carried out with good centring, the only finishing grinding necessary on the pin is that of the thrust bearing surface 32 and the cylindrical parts 24 and 26. Any small errors in parallelism are acceptable if the big end 40 is loosely coupled to the connecting rod itself as for example when one is dealing with a rod of the type illustrated and described in patent application No. 67969-A/80 filed on June 20, 1980 in the name of the same applicants.

A crankshaft as described and illustrated has various advantages, both technological and operational.

Among the technological advantages which have already been mentioned to a greater extent in the course of the preceding description, there is the simplification in the working cycle, a simplification which is due above all to the fact that individual pieces (24 and 44) which are smaller than a crankshaft formed in a single piece, are subject to the pre-working operations.

The formation of the piece 24 from a tube and the formation of the piece 44 from a sintered material allow several conventional working operations to be eliminated, especially boring to form or complete the duct for the passage of lubricating oil.

Savings are also achieved in storage cost since, as is clear, the pieces 24 on the one hand may be stored in a compact manner and also, on the other hand, the shaped pieces 44 may be stored in a relatively compact manner.

It is also envisaged that tubular pieces 24 of a single type and size may be used with shaped pieces 44 of different size that is having for example smaller or larger eccentrics 22 according to the power of the compressor for which they are intended.

From a functional point of view the fact that the internal duct of the tubular part 24 is obtained from a calibrated tube allows the duct surface to be sufficiently smooth so that it does not result in any appreciable loss of pressure of the oil which rises in the duct. Even in the transition zone between the internal surfaces of the frusto-conical part 30 and the cylindrical part 28 there are no harmful discontinuities from the point of view of pressure loss, if, as is preferred, the frusto-conical part 30 is obtained by rotary hammering with an internal pin.

Finally, the formation of the piece 44 from porous sintered material gives this material, to good effect, a better lubricating capacity of the surfaces of the crank pin 20 and of the thrust bearing projection 32.

The second embodiment of the crankshaft illustrated in FIGS. 5 and 6 differs from the first embodiment illustrated in FIGS. 2 to 4 only in details which will now be described. The parts of the shaft of FIGS. 5 and 6 which are the same as or similar to those of FIGS. 2 to 4 are indicated by the same reference numerals and will not be re-described.

In the case of FIGS. 5 and 6, in the formation of the piece 44 there has been formed, in the face of the eccentric 22 opposite the pin 20, an annular engagement formation constituted by an annular boss 64 with an outer cylindrical surface.

The internal surface of the piece of tube 24 is formed at its corresponding end with a cylindrical annular seat 66 with a diameter corresponding to that of the boss 64.

In this case the annular engagement formations are constituted by the boss 64 and the seat 66 in which the boss 64 is engaged.

The retention of these formations 65, 66 in engagement may also be achieved in this case by projection welding in the zone of contact between the end of the piece of tube 24 and the eccentric 22 or with a structural or anaerobic adhesive for metals interposed between the coupled surfaces of the boss 64 and the seat 66.

The boss has a longitudinal cut 68 through which the oil may flow out from the lateral hole 62 situated higher up and which, this being more important, acts as a channel for conveying the oil, which ascends the tubular part 24 by adhering by centrifugal force to its wall, to the internal duct 48 of the pin 20.

We claim:

1. A crankshaft for small reciprocating machines, particularly hermetic compressors for refrigerators of the type comprising a crankpin adapted to be connected to one end of a connecting rod, an eccentric having a flat sector formed with opposed faces and an elongated tubular element disposed in succession along the longitudinal direction of the crankshaft, said elongated tubular element being disposed non-coaxial with respect to the crankpin and acting partly as a journal and partly as a support for a rotary member such as a rotor of an electric motor wherein said crankpin and said eccentric are formed in a single sintered metal piece and the elongated tubular element is constituted by separate piece of soft steel tube, interfitting, complementary annular formations disposed on one of said faces of said eccentric and on one end of said tubular element and means for connecting said annular formations together, said annular formation on said one end of said tubular element being a terminal seat formed in the internal surface thereof and said annular formation disposed on said eccentric is an annular boss which is engaged in said seat and wherein said crankpin is tubular and has a longitudinal internal duct which opens through said eccentric and said boss has a longitudinal cut aligned with said duct to define a channel for conveying lubricating oil from the interior of said tubular element to said duct.

2. A crankshaft as set forth in claim 1 wherein said tubular element is formed with a lubricating hole which communicates with the channel defined by said cut in said boss.

* * * * *